United States Patent [19]
Schultz et al.

[11] Patent Number: 5,602,428
[45] Date of Patent: Feb. 11, 1997

[54] SWITCH MAT WITH ACTIVE THRESHOLD

[75] Inventors: Joseph F. Schultz; Duane M. Jensen, both of Brainerd, Minn.

[73] Assignee: Acrometal Companies, Inc., Plymouth, Minn.

[21] Appl. No.: 484,652

[22] Filed: Jun. 7, 1995

[51] Int. Cl.$^6$ .................................................. H01H 35/00
[52] U.S. Cl. ........................ 307/119; 307/116; 200/86 R; 200/86 A; 361/749; 340/573; 340/666
[58] Field of Search .................................. 307/116, 119; 200/86 R, 86 A; 361/749; 340/573, 666

[56] References Cited

U.S. PATENT DOCUMENTS

| | | | |
|---|---|---|---|
| 3,821,500 | 6/1974 | Newman | 200/86 |
| 3,830,991 | 8/1974 | Durocher | 200/86 |
| 4,105,899 | 8/1978 | Velosa | 307/155 |
| 4,392,176 | 7/1983 | Kneip et al. | 361/160 |
| 4,497,989 | 2/1985 | Miller | 200/86 |
| 4,661,664 | 4/1987 | Miller | 200/86 |
| 4,920,241 | 4/1990 | Miller | 200/86 |
| 4,939,358 | 7/1990 | Herman et al. | 250/221 |
| 5,510,586 | 4/1996 | Hacking | 200/86 |

*Primary Examiner*—William M. Shoop, Jr.
*Assistant Examiner*—Kim Lockett
*Attorney, Agent, or Firm*—Kinney & Lange, P.A.

[57] ABSTRACT

A pressure sensitive switch mat capable of interconnection with other such switch mats on all sides to eliminate non-activation zones as disclosed. The switch mat has a main switch mat portion and an activation edge on all sides of the switch mat. The activation edge includes a connector retainer lip, an actuation platform and an end portion. When an actuation force is applied to the actuation platform, the switch mat is actuated. A bridge connector for connecting adjacent pressure sensitive switch mats to eliminate non-activation zones therebetween is disclosed. Additionally, a control circuit for the switch mat system that has an integrity monitoring system for providing reliable control of the switch mat system is disclosed.

40 Claims, 7 Drawing Sheets

SWITCH MAT WITH ACTIVE THRESHOLD

BACKGROUND OF THE INVENTION

The present invention relates to pressure sensitive switch mats. In particular, the present invention relates to pressure sensitive switch mats capable of interconnection with other such switch mats on all sides to eliminate non activation zones, or dead zones, therebetween.

Providing safety systems for dangerous machinery is commonly known. Examples of such safety systems include dual hand operated controls which forces an operator to keep both hands on the controls, presence sensing devices incorporating light beam and receivers, and singular electric switch mats connected to a machine control unit. With the utilization of larger and faster robotics and continuous operation machine tools, a need developed for the protection of areas too large to cover with individual electric switch mats and not protectable with light beam technology because of moving parts and equipment, irregular shapes of machinery, and other restrictions. Not only did a need develop, the federal government set safety standards which must be met in machine operating applications to ensure adequate worker safety. The Occupational Safety and Health Administration (OSHA) and the American National Standards Institute (ANSI) have set machine tool safety standards that dictate the criteria which must be met. The standard which has been set is that a safety mat device shall detect and respond to the presence, or absence, of the operator or others anywhere on its sensing surface. The sensing surface is defined as the area covered by a single mat or a plurality of mats in combination.

In an attempt to address the need for safety, electric switch mats came to be used in combination to protect areas not protectable by one mat. This practice, however, resulted in "dead zones", "non-activation zones", or "dead seams" where the mats abutted. The dead zones provide a narrow pathway through the protected area and do not comply with OSHA or ANSI standards. In an attempt to eliminate the dead zones, custom mats have been designed to fit individual applications. This approach, however, results in the need to engineer and produce individual mats for each specific application and results in a very high production cost and long lead times.

Figure 1:
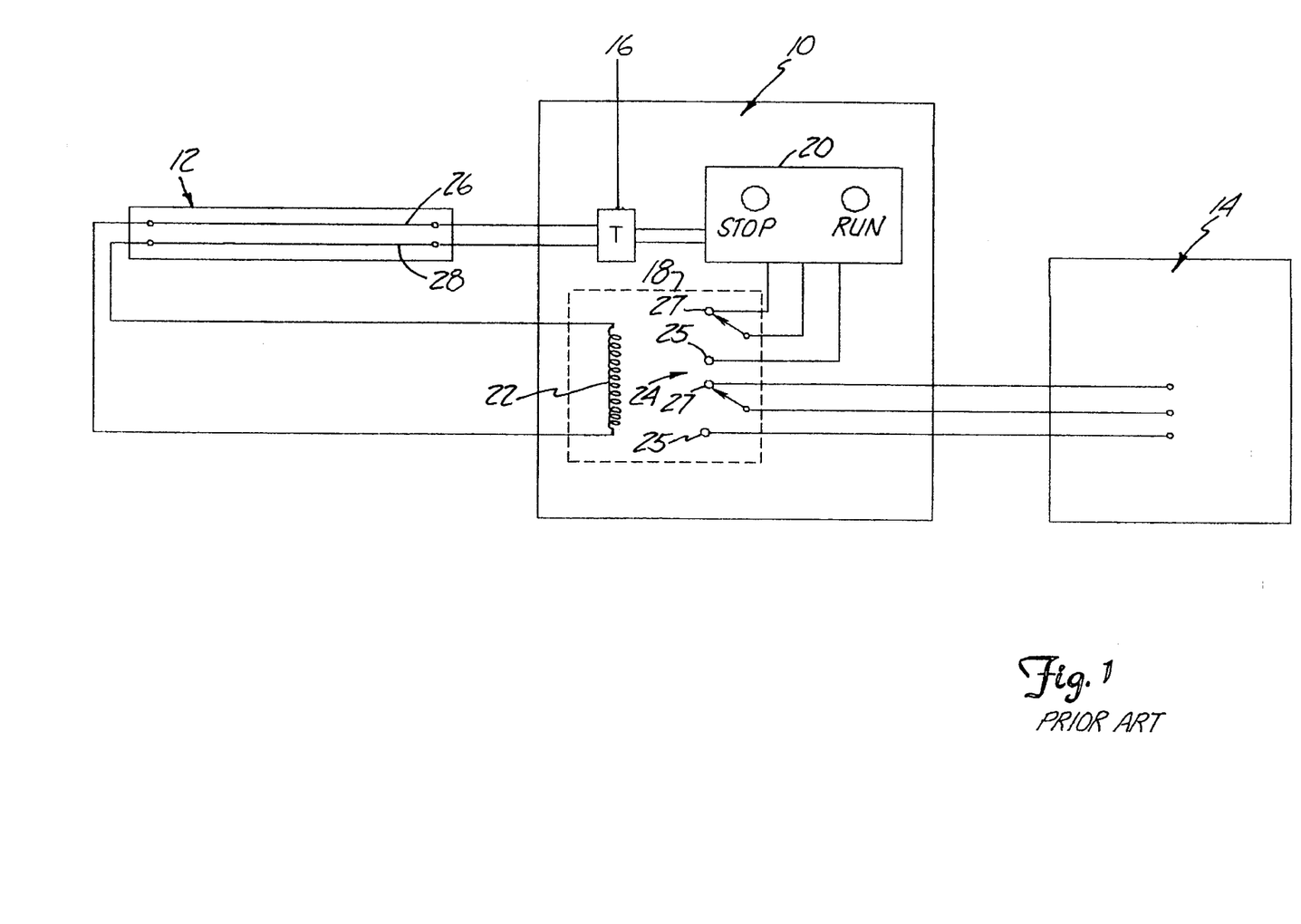
FIG. 1 is a schematic illustration of a prior art intermediate safety control system.

The use of multiple switch mats in combination precipitated the need for a safety control device between the mats and a machine control circuit. Multiple switch mats are electrically connected by switch mat wires and are connected to a machine control circuit that controls the machine about which the mats are placed. The safety control device serves as the joining point for the mat wires to consolidate the sensing signals into a single interface with which the machine control circuit is connected. The safety control device also serves as a means for monitoring the integrity of the wiring and the circuitry within the safety mat system. FIG. 1 illustrates a safety control 10 connected between an electronic switch mat 12 and a machine control circuit 14. The safety control 10 includes a power supply 16, a relay 18 and a status display 20. The relay 18 contains a relay coil 22 and a plurality of relay contacts 24. The relay contacts 24 include normally open contacts 25 and normally closed contacts 27. The electric switch mat 12 includes a top electrode plate 26 and a bottom electrode plate 28. The relay coil 22 of the safety control 10 is connected across the top and bottom electrode plates 26 and 28.

In operation, a current is applied through the top electrode plate 26. If there is no pressure on the electric switch mat 12, the current will flow through the top electrode plate 26 and into the relay coil 22. From the relay coil 22, current will flow back through the bottom electrode plate 28. When the relay coil 22 is energized, the relay contacts 24 move from their normally closed state 27 to a normally opened state 25. The machine control stop circuit 14 is connected across the normally opened contacts 25 which allows the machine being protected to operate when the relay coil 22 is energized. When pressure is applied to the electric switch mat 12, the top electrode plate is forced into contact with the bottom electrode plate 28 forming a short circuit. The current flowing in the top electrode plate is shorted into the bottom electrode plate, bypassing the relay coil 22. The relay contacts 24 return to their normally closed position 27 which opens the machine control stop circuit 14 and results in the machine being disabled.

The operating principle of the above system is sound but it does not meet ANSI machine safety standards for control reliability. The ANSI regulation for control reliability states that ". . . the device, system or interface shall be designed, constructed, and installed such that a single component failure within the device, interface or system shall not prevent normal stopping action from taking place but shall prevent a successive machine cycle." American National Standard, B 11.19-1990, §5.5.1. In the embodiment illustrated in FIG. 1, the failure of a single component could result in the unsafe operation of the machine. For example, if the welding of a single relay contact was to occur, the machine might still operate even with pressure applied to the electric switch mat 12. Thus, FIG. 1 does not meet ANSI control reliability standards.

There is a continuing need for a prefabricated, pressure sensitive switch mat that is capable of connecting with other such switch mats on all sides, and capable of covering irregular floor plans, thereby reducing ordering times, manufacturing costs, and engineering costs. There is also a need for a safety control device for controlling and monitoring switch mat integrity, machine circuit integrity and system integrity that meets set safety standards.

SUMMARY OF THE INVENTION

The present invention overcomes the above draw backs and limitations by providing a pressure sensitive switch mat capable of interconnection with other such switch mats on all sides to eliminate non activation zones. The switch mat has a main switch mat portion and an activation edge on all sides of the switch mat. The activation edge has a connector retaining lip, an actuation platform and an end portion. When an actuation force is applied to either the main switch mat portion or the actuation platform, the switch mat is actuated. The present invention also discloses a bridge connector for connecting adjacent pressure responsive switch mats to eliminate non activation zones therebetween. The present invention also discloses a safety control circuit for a switch mat system that has an integrity monitoring system for providing reliable control of the switch mat system.

DETAILED DESCRIPTION OF THE PREFERRED EMBODIMENTS

Figure 2:
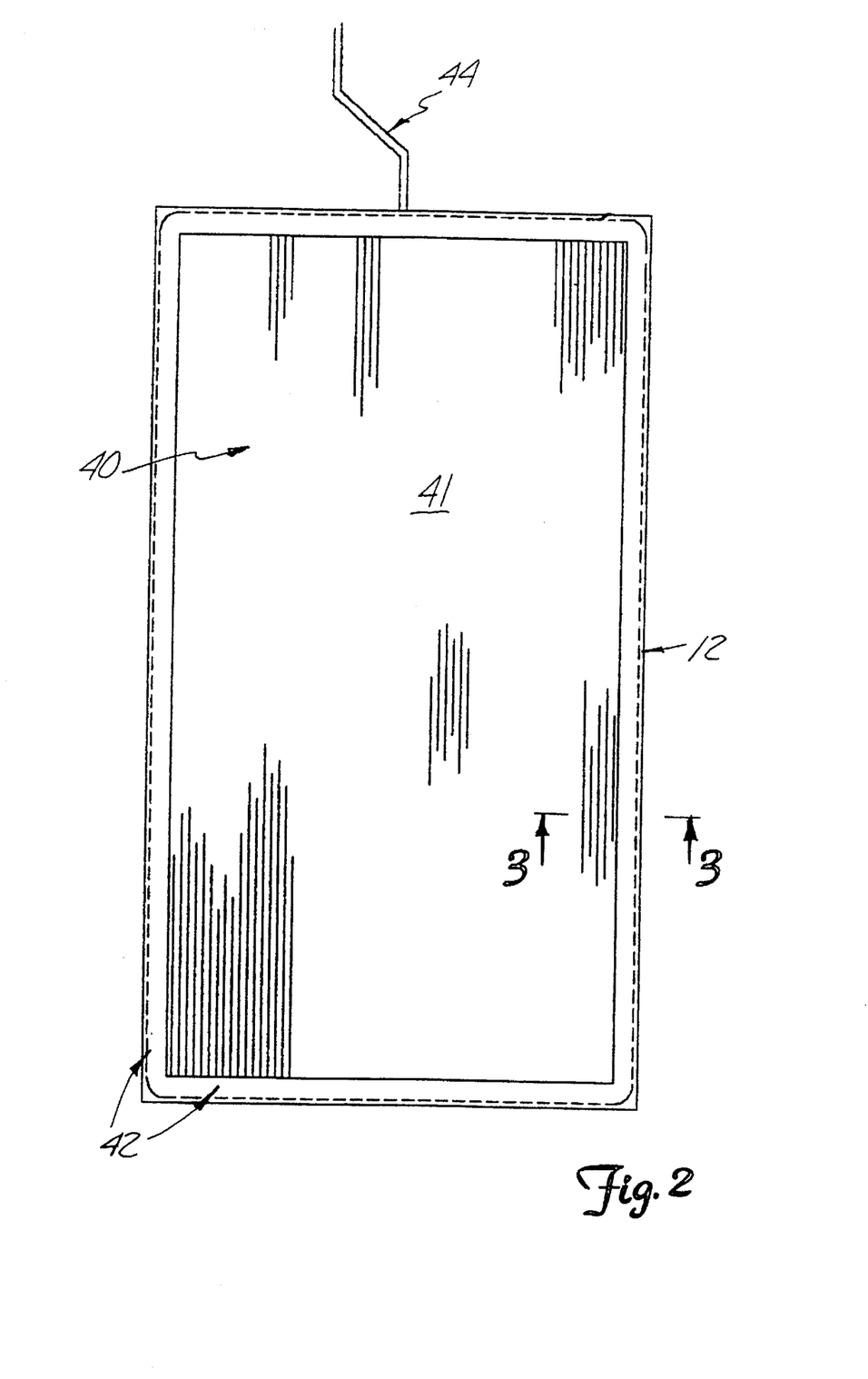
FIG. 2 is a top plan view of a pressure sensitive electric switch mat according to the present invention.

FIG. 2 illustrates a pressure sensitive electrical switch mat 40 according to the present invention. This switch mat 40 has a top surface 41, a bottom surface 43 (not seen in FIG. 2), an activation edge 42 about the entire mat which connects the top and bottom surfaces 41 and 43 respectively, and an electrical cord 44 for providing power to energize the mat 40. Preferably, the mat 40 is made from flexible electrical insulating material, such as rubber or synthetic plastic material having electrical insulating qualities. Additionally, it is important that the mat be sealed against the entry of moisture or foreign material and that the mat be resilient to withstand industrial applications.

Figure 3:
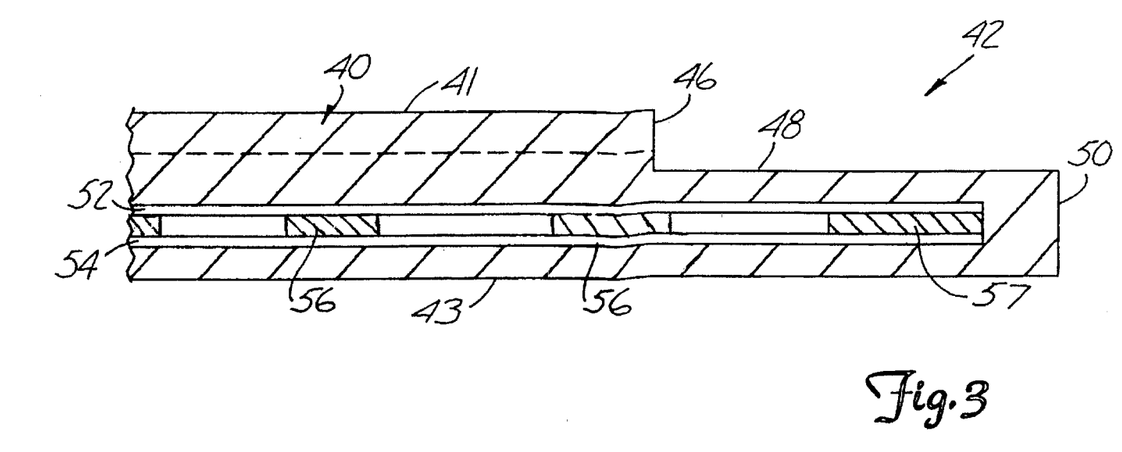
FIG. 3 is a partial sectional view of the pressure sensitive electrical switch mat according to the present invention.

FIG. 3 is a cross sectional view of a portion of the pressure sensitive switch mat 40 illustrating the activation edge 42 in greater detail. The activation edge 42 comprises a connector retaining lip 46, an actuation platform 48 and an end portion 50. The retaining lip 46 extends downward from the top surface 41, and is substantially perpendicular thereto. The actuation platform 48 is connected to the retaining lip 46 and is substantially parallel to the bottom surface 43. The actuation platform 48 extends to substantially cover the bottom surface 43. The end portion 50 connects the bottom surface 43 and the actuation platform 48 to form a sealed enclosure.

Upper and lower conductor plates 52 and 54, respectively, are vertically spaced and disposed in a face to face engagement inside the switch mat 40. The electrode plates 52 and 54 of the preferred embodiment are stiff sheet steel having good electrical conductivity. Stiff sheet steel is used to withstand heavy industrial traffic such as fork lifts and the like. Relatively thin flexible sheet metal such as copper, bronze or other metal having good electrical conductivity could also be used, but may not withstand the heavy industrial traffic. The electrode plates 52 and 54 are electrically connected to the electrical cord 44 in a commonly known manner (not shown), to provide a current to the electrode plates. When a multiple mat configuration is desired, the mats are electrically connected to each other in a series arrangement with the mats connected to a power source.

Spacers 56 are provided between the electrode plates 52 and 54 to maintain separation of the electrode plates in the absence of a preselected actuating force. The spacers 56 are made from a suitable electrical insulating material. As can be seen in FIG. 3, the upper and lower electrode plates 52 and 54 extend substantially past the connector retaining lip 46 and under the actuation platform 48. An end spacer 57 is provided at the end of the electrode plates 52 and 54 to space the electrode plates and to secure the electrode plates.

Figure 4:
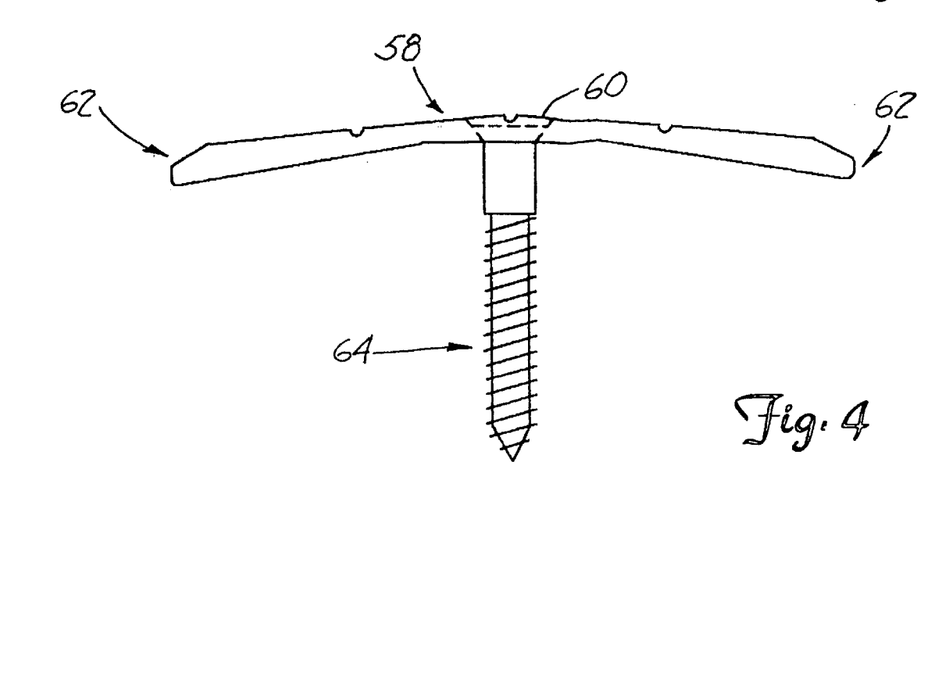
FIG. 4 is a side elevational view of a bridge connector according to the present invention.

FIG. 4 illustrates a bridge connector 58. The bridge connector 58 is a rigid component that bridges the gap between adjacent switch mats in a multiple mat configuration and also forms a transition threshold between a mat and the ground. The bridge connector 58 includes a tread surface 60, a pair of pressure transfer legs 62 and an adjustable mounting member 64. In the preferred embodiment, the bridge connector is extruded aluminum but any such rigid material would suffice. The adjustable mounting member 64 of the preferred embodiment is an anchoring screw.

Figure 5:
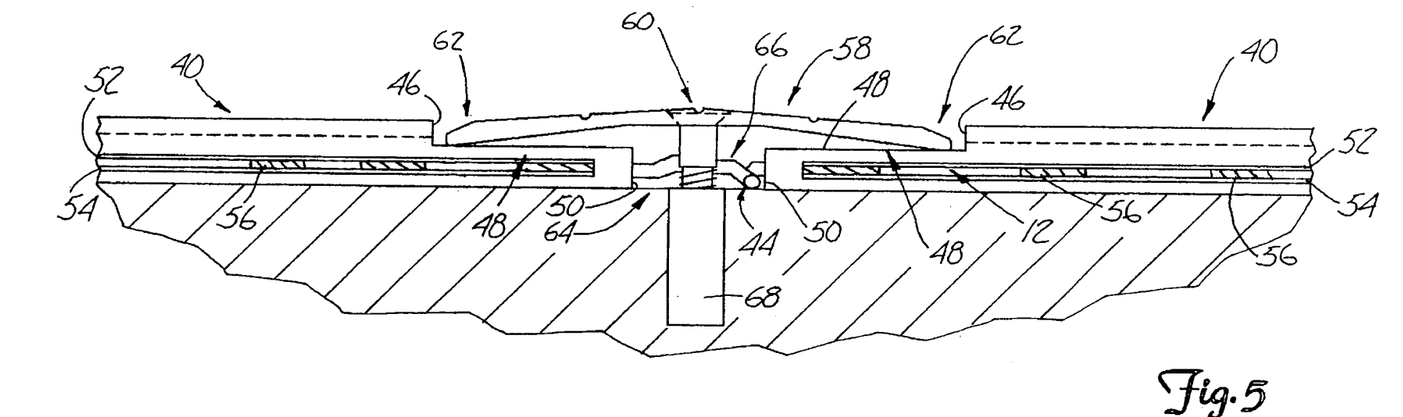
FIG. 5 is a side elevational view of a portion of a pair of pressure sensitive electrical switch mats with a bridge connector joining them.

FIG. 5 illustrates a pair of switch mats 40 positioned adjacent each other and having a gap 66 therebetween. The bridge connector 60 spans the gap 66 to eliminate a dead zone between the two switch mats. As illustrated in FIG. 5, the pressure transfer legs 62 rest on the actuation platforms 48 of the activation edges 42. The adjustable mounting member 64 is secured into a receiving member 68 in the ground. The adjustable mounting member 64 may be adjusted by rotating the screw such that the pressure transfer legs 62 apply sufficient pressure to compress the top electrode plates 52 until they almost make contact with the bottom electrode plates 54. The amount of adjustment is left to the individual. If a very small actuation force is desired to cause the electrode plates to contact each other the electrode plates should be brought very close to each other. If a larger actuation force is desired, the electrode plates should not be compressed very much.

When an actuation force is applied to the electric switch mat 40, the upper electrode plate 52 is compressed until it contacts the bottom electrode plate 54 thereby causing a short circuit, as will be described in detail below. When an actuation force is applied to the tread surface 60 of the connector 58, the actuation force is transferred to the pressure transfer legs 62. The transfer legs 62 transfer the force downward against the actuation platform 48. The actuation force will compress the upper electrode plate 52 until it contacts the lower electrode plate 54 causing a short circuit.

Figure 6:
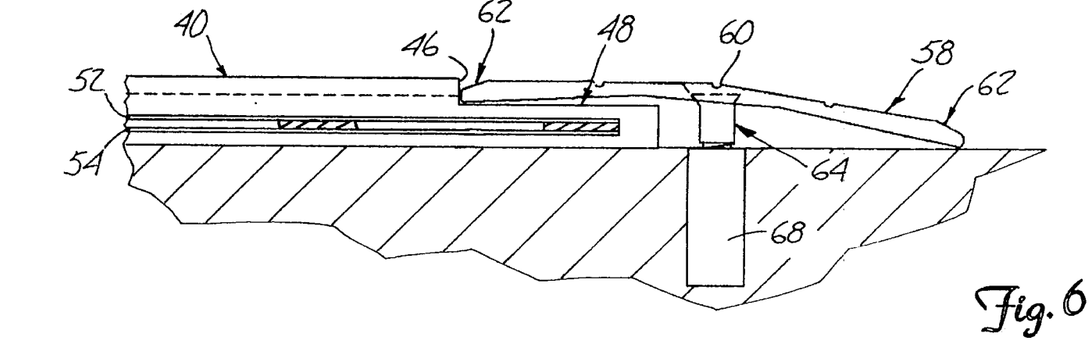
FIG. 6 is a side elevational view of a portion of a pressure sensitive electrical switch mat having a bridge connector acting as a threshold.

FIG. 6 is a side elevational view of portion of a pressure sensitive electrical switch mat having a bridge connector 58 acting as a threshold between the switch mat 40 and the ground. One of the pressure transfer legs 62 rests on the ground while the other rests on the actuation platform 48. As with the embodiment illustrated in FIG. 5, the adjustable mounting member 64 is secured into a receiving member 68 and is adjustable by rotating the screw in a tightening manner. The adjustable mounting member 64 is adjusted in the same way as was previously described with respect to FIG. 5. When an actuation force is applied to the bridge connector 58 of the threshold configuration of FIG. 6, a portion of the actuation force is transferred to the transfer leg 62 that is resting on the actuation platform 48 and which abuts the retaining lip 46 and a portion of the force is transferred to the leg 62 on the ground. The actuation force is applied to the actuation platform 48 which causes the upper electrode plate 52 to compress until it contacts lower electrode plate 54 causing a short circuit.

Figure 7:
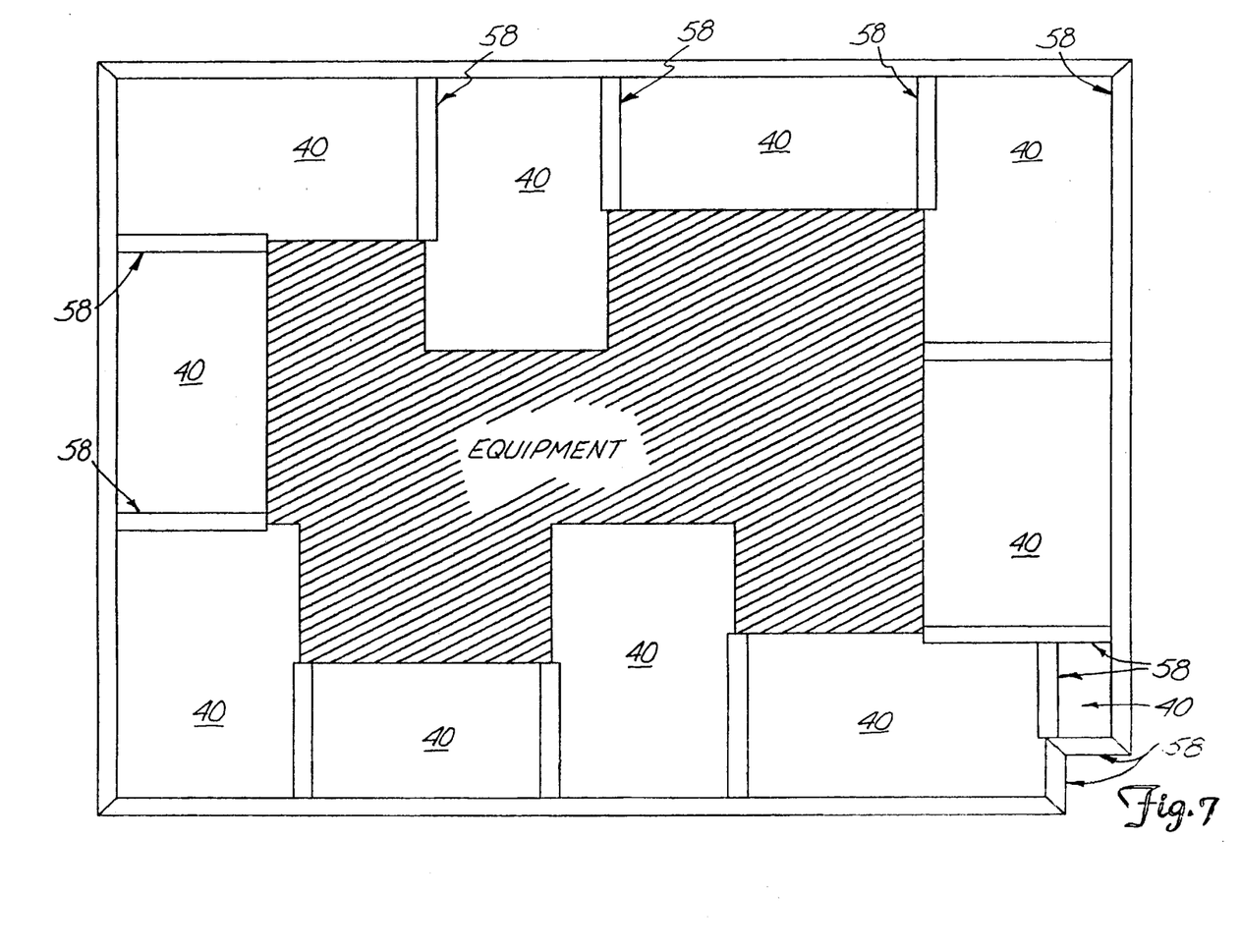
FIG. 7 is a schematic view of a multi mat installation illustrating a 100% activation area about a piece of equipment.

FIG. 7 is a schematic view of a multi mat installation illustrating a 100% activation area about a piece of equipment. Each of the switch mats 40 has a bridge connector 58 either spanning a gap between adjacent mats or acting as a threshold between a mat and the ground. In this configuration, there are no dead zones where an operator could walk without activating a switch mat.

Figure 8A:
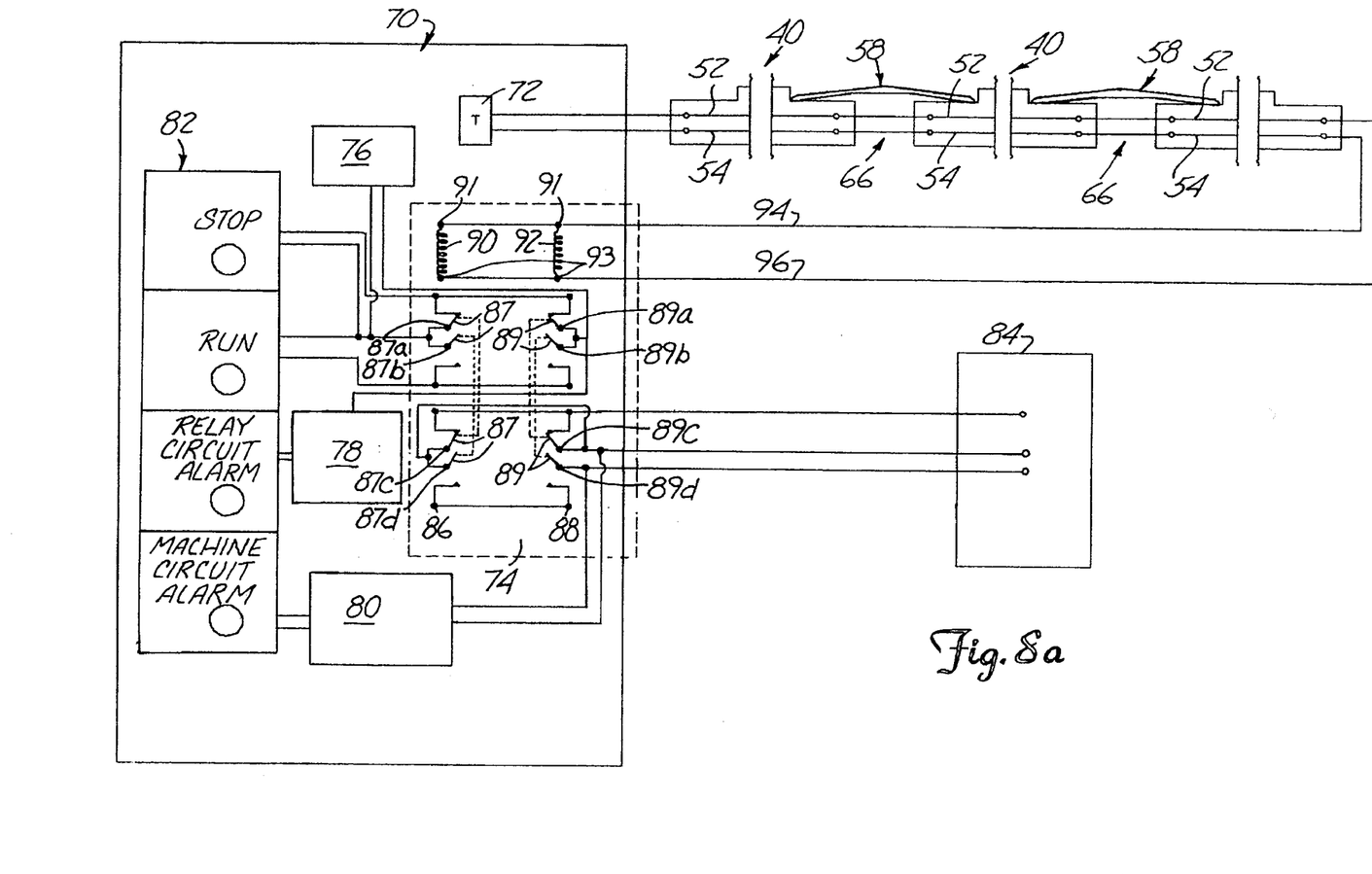
FIG. 8A is a schematic illustration of a multi mat system having a safety control system in a mat circuit fault, or a machine stop state.
Figure 8B:
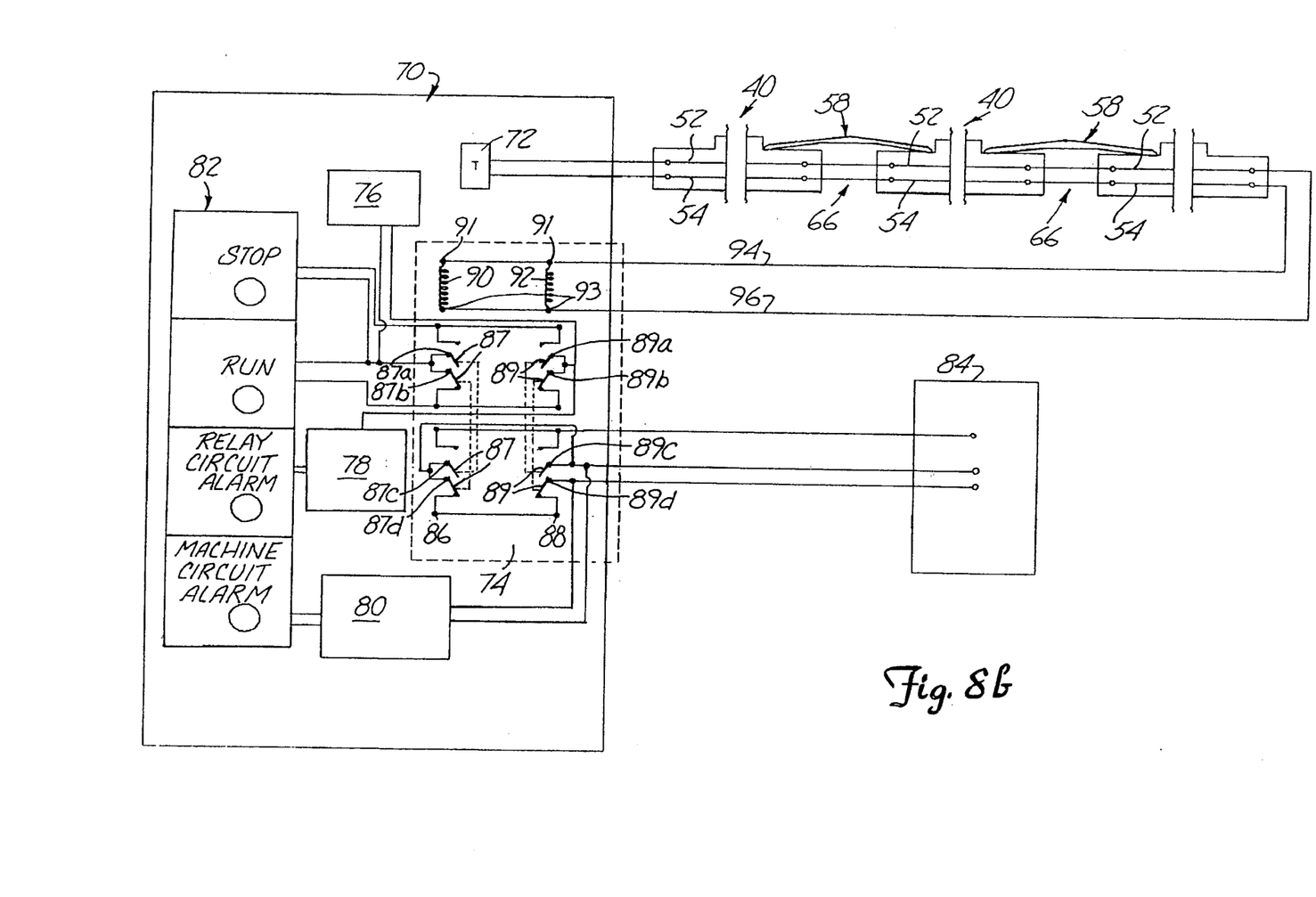
FIG. 8B is a multi mat system having a safety control system in a mat circuit ok, or a machine run state.

FIGS. 8A and 8B illustrate a multi mat configuration having a safety control circuit 70. A plurality of switch mats 40 are illustrated connected in series with a bridge connector 58 spanning the gap 66 between the mats 40. Safety control 70 comprises a power supply 72, a relay circuit 74, a start up verification check 76, a relay circuit monitor 78, a machine circuit monitor 80 and status displays 82. A machine control circuit 84 is connected to the safety control 70 and enables and disables the machine connected to the switch mats.

The relay circuit 74 of the present invention incorporates a pair of redundant relays 86 and 88 having relay contacts 87 and 89, respectively. Relays 86 and 88 operate as parallel relays with the relay contacts 87 and 89 being mechanically linked as described below. Relay contacts 87 and 89 contain individual relay contacts 87*a*, *b*, *c*, and *d* and 89*a*, *b*, *c*, and *d*, respectively. Relay contact 87*a* is mechanically linked to relay contact 87*c*, and relay contact 87*b* is mechanically linked to relay contact 87*d*. Relay contacts 89*a* and *c*, and 89*b* and *d* are mechanically linked in a similar manner. A pair of inductive coils are provided adjacent each relay 86 and 88 for causing movement of the relay contacts 87 and 89. Each of the inductor coils 90 and 92 is connected between terminals 91 and 93.

First and second conductors 94 and 96 are provided for connecting the multiple switch mats 40 to the safety control circuit 70. Each of the top electrode plates 52 of the switch mats 40 is connected to the power supply 72 by the second conductor 96. The top electrode plates 52 are also connected to terminal 93 which is connected to the inductive coils 90 and 92. The bottom electrode plates 54 of the switch mats 40 are connected to the power supply 72 by the first conductor 94 and they are also connected to the inductive coils 90 and 92 at terminal 91.

In FIG. 8A, the relay contacts 87 and 89 are illustrated in a first position or state. The relays 86 and 88 are spring biased to be in a first state when no power is provided to the adjacent coils 90 and 92. When power is applied to the adjacent coils 90 and 92, a magnetic field is generated causing the relay contacts 87 and 89 to move to a second position or state. The relay contacts will be in the first state when no power is applied or when an actuation force is applied to the switch mats causing the top electrode plate 52 to contact the bottom electrode plate 54 causing a short circuit between the first and second conductors. When a short circuit occurs, current flowing in the first conductor 94 is shorted to the second conductor 96 and therefore no current reaches the inductive coils 90 and 92 to energize the coils. Therefore, no magnetic field is created and the relays 87 and 89 are spring biased to the first state. When relay contacts 87 and 89 are in the first state, the stop light of the status display 82 is illuminated. Additionally, when the relay contacts 87 and 89 are in the first state, the machine control circuit will disable the machine.

The start up verification check 76 confirms the harmony of the positioning of the relay contacts 87 and 89. If each of the relay contacts are not in the same state, the machine control circuit 84 will keep the machine being protected disabled. The relay circuit monitor 78 confirms the harmony of the relay contacts 87 and 89 during the operation of the machine when it is enabled. The machine circuit monitor 80 confirms the integrity of the wiring between the machine being protected and the safety control circuit 70.

FIG. 8B is identical to FIG. 8A except that the relay contacts 87 and 89 are now in a second state. In this configuration, current is flowing from the power supply 72 through each of the top electrode plates 52 of the switch mats 40, through the second conductor 96 energizing the inductive coils 90 and 92. The current then flows back to the power supply through the first conductor 94 and through the bottom electrode plates 54. With the inductive coils 90 and 92 energized, a magnetic field is generated causing the relay contacts 87 and 89 to move into the second state. When the relay contacts 87 and 89 are in the second state, the run display light of the status display 82 is illuminated and the machine control circuit 84 enables the machine being protected.

Although the present invention has been described with reference to preferred embodiments, workers skilled in the art will recognize that changes may be made in form and detail without departing from the spirit and scope of the invention.

What is claimed is:

1. A pressure sensitive switch mat capable of interconnection with other such switch mats on all sides to eliminate non-activation zones, the switch mat having a bottom surface and a top surface, the top surface including a main activation portion and an activation edge on all sides of the top surface, the activation edge surrounding and connecting to the main activation portion and the activation edge comprising:

a connector retaining lip;

an actuation platform connected to the retaining lip such that an actuation force applied to the actuation platform actuates the switch mat; and an end portion connecting the actuation platform to the bottom surface of the switch mat.

2. The apparatus as in claim 1 wherein the pressure sensitive switch mat includes upper and lower vertical spaced electrode plates extending past the connector retaining lip and under the actuation platform of the top surface of the switch mat.

3. The apparatus as in claim 2 wherein the electrode plates extend to a point beyond the main activation portion to a point adjacent the end portion.

4. The apparatus as in claim 2 further comprising a plurality of spacers positioned between the electrode plates to maintain separation of the electrode plates in the absence of a preselected actuating force.

5. A system for connecting adjacent prefabricated pressure sensitive switch mats and eliminating non-activation zones therebetween, the system comprising:

a plurality of adjacent switch mats, each of the mats having a bottom surface and a top surface, the top surface including a main activation portion and an activation edge on all sides of the top surface, the activation edges surrounding and connecting to the main activation portion and the activation edge comprising:

a connector retaining lip;

an actuation platform connected to the retaining lip such that an actuation force applied to the actuation platform actuates the switch mat; and an end portion connecting the actuation platform to the bottom surface of the switch mat; and at least one connector for connecting the actuation platforms of adjacent switch mats such that an actuation force applied to the connector is transferred to the actuation platforms causing actuation of the switch mats and elimination of non-activation zones therebetween.

6. The system as in claim 5 wherein the pressure sensitive switch mats include upper and lower vertically spaced electrode plates extending past the connector retaining lip and under the actuation platform of the top surface of the switch mat.

7. The system as in claim 6 wherein the electrode plates extend to a point beyond the main activation portion to a point adjacent the end portion.

8. The system as in claim 6 further comprising a plurality of spacers positioned between the electrode plates to maintain separation of the electrode plates in the absence of a preselected actuating force.

9. The system as in claim 5 wherein the connector is extruded aluminum.

10. The system as in claim 5 wherein the connector includes an adjustable mounting member for anchoring the connector.

11. The system as in claim 10 wherein the adjustable mounting member includes an anchoring screw, wherein when the anchoring screw is tightened, the connector is pulled downward pushing the actuation platform downward and causing the electrode plates to move closer to one another, decreasing the actuation force necessary to actuate the switch mat.

12. The system as in claim 5 further comprising a control circuit connected to the switch mats.

13. A system for connecting adjacent prefabricated electric switch mats and eliminating non-activation zones therebetween, the system comprising:

a plurality of adjacent switch mats, each of the mats comprising:
   a top and bottom surface, wherein the bottom surface has a surface area greater than the surface area of the top surface;
   a plurality of edges defining the boundary of the mat and connecting the top surface and the bottom surface to form a water resistant enclosure, each of the edges comprising:
      a connector retaining lip extending downward from the top surface;
      an electrode actuation platform connected to the connector retaining lip, the electrode actuation platform being substantially parallel to the bottom surface and extending outward to substantially cover the bottom surface such that a surface area of the top surface plus a surface area of the electrode actuation platform substantially equals a surface area of the bottom surface; and
      an end portion connecting the electrode actuation platform and the bottom surface;
   upper and lower vertically spaced electrode plates disposed in face-to-face arrangement inside the enclosure formed by the top surface, the bottom surface and the edges;
   a plurality of spacers positioned between the electrode plates to maintain separation of the electrode plates in the absence of a preselected actuating force; and
   a power connection cord connected to the electrode plates for connection to an external power source; and at least one connector for connecting the electrode actuation platforms of adjacent electric switch mats such that an actuation force applied to the connector is transferred to the electrode actuation platforms causing actuation of the switch mats and elimination of non-activation zones therebetween.

14. The system as in claim 13, wherein the electrode plates extend past the connector retaining lip to a point adjacent the end portion and under the actuation platform of the top surface of the switch mat.

15. The system as in claim 13 wherein the connector is extruded aluminum.

16. The system as in claim 13, wherein the connector includes an adjustable mounting member for anchoring the connector.

17. The system as in claim 16, wherein the adjustable mounting member includes an anchoring screw, wherein when the anchoring screw is tightened, the connector is pulled downward pushing the actuation platform downward and causing the electrode plates to move closer to one another, decreasing the actuation force necessary to actuate the switch mat.

18. The system as in claim 13 and further comprising a control circuit connected to the switch mats.

19. A control circuit for a switch mat system having at least one switch mat, wherein the control circuit is electrically connected between the at least one switch mat and a machine to be protected, the control circuit having an integrity monitoring system for providing reliable control of the switch mat system, the control circuit comprising:

a power supply for supplying power to the control circuit through the at least one switch mat;

switching means for switching between a first and second state, the switching means being electrically connected to the at least one switch mat;

monitoring means connected to the switching means for monitoring the integrity of the control circuit; and alert means connected to the monitoring means for alerting an operator when a lack of integrity is detected by the monitoring means.

20. The control circuit as in claim 19 wherein the switching means comprises first and second relay sets for switching between normally opened and normally closed states, the first and second relay sets being mechanically linked for parallel operation.

21. The control circuit as in claim 20 wherein a pair of inductive coils are provided adjacent the first and second relay sets to cause movement of the relay sets.

22. The control circuit as in claim 20 further comprising a start-up verification circuit for insuring that the first and second relay sets are acting in harmony upon start-up.

23. The control circuit as in claim 20 further comprising a relay circuit monitoring circuit for insuring that the first and second relay sets are acting in harmony while the machine being protected is operable.

24. The control circuit as in claim 20 further comprising a machine circuit monitor circuit for confirming the integrity of the electrical connection between the control circuit and the machine being protected.

25. A system for eliminating non-activation zones along the edge portions of a pressure sensitive switch mat, the system comprising:

a switch mat having a bottom surface and a top surface, the top surface including a main activation portion and an activation edge on all sides of the top surface, the activation edge surrounding and connecting to the main activation portion and the activation edge comprising:
   a connector retaining lip;
   an actuation platform connected to the retaining lip such that an actuation force applied to the actuation platform actuates the switch mat; and
   an end portion connecting the actuation platform to the bottom surface of the switch mat; and at least one connector for connecting the actuation platform of the switch mat and a ground surface, the connector comprising:

a first end that sits on the actuation platform of the switch mat; and a second end that sits on the ground surface to form a threshold such that an actuation force applied to the connector is transferred to the actuation platform causing actuation of the switch mat and elimination of the non-activation zones.

26. The system as in claim 25 wherein the pressure sensitive switch mat includes upper and lower vertical spaced electrode plates extending past the connector retaining lip and under the actuation platform of the top surface of the switch mat.

27. The system as in claim 26 wherein the electrode plates extend to a point beyond the main activation portion to a point adjacent the end portion.

28. The system as in claim 26 further comprising a plurality of spacers positioned between the electrode plates to maintain separation of the electrode plates in the absence of a preselected actuating force.

29. The system as in claim 25 wherein the connector is extruded aluminum.

30. The system as in claim 25 wherein the connector includes an adjustable mounting member for anchoring the connector.

31. The system as in claim 30 wherein the adjustable mounting member includes an anchoring screw, wherein when the anchoring screw is tightened, the connector is pulled downward pushing the actuation platform downward and causing the electrode plates to move closer to one another, decreasing the force necessary to actuate the switch mats.

32. The system as in claim 25 further comprising a control circuit connected to the switch mats.

33. A system for connecting adjacent pressure sensitive switch mats and eliminating non-activation zones therebetween, the system comprising:

a plurality of adjacent switch mats, each of the mats having an activation surface such that an actuation force applied to the activation surface actuates the switch mat; and at least one connector for connecting the activation surfaces of adjacent switch mats such that an actuation force applied to the connector is transferred to the activation surface of at least one of the adjacent switch mats causing actuation of at least one switch mat.

34. The system as in claim 33 wherein the pressure sensitive switch mat includes upper and lower vertical spaced electrode plates that extend to a point adjacent the end of the switch mat.

35. The system as in claim 34 further comprising a plurality of spacers positioned between the electrode plates to maintain separation of the electrode plates in the absence of a preselected actuating force.

36. The system as in claim 33 wherein the connector is extruded aluminum.

37. The system as in claim 33 wherein the connector includes an adjustable mounting member for anchoring the connector.

38. The system as in claim 37 wherein the adjustable mounting member includes an anchoring screw, wherein when the anchoring screw is tightened, the connector is pulled downward pushing the actuation platform downward and causing the electrode plates to move closer to one another, decreasing the force necessary to actuate the switch mats.

39. The system as in claim 33 further comprising a control circuit connected to the switch mats.

40. A switch mat system comprising:

a switch mat having a bottom surface for resting on a ground surface and having an activation surface which is responsive to downward actuation force to actuate the switch mat; and a connector positioned along an edge of the switch mat and connected to the ground surface, the connector having a portion which overlays a portion of the activation surface of the switch mat to hold down the edge of the switch mat and to transfer force applied to the connector to the activation surface of the switch mat as downward actuation force, so that when the connector is stepped on, the switch mat is actuated.

* * * * *